US007464872B2

(12) United States Patent
Doerwald (10) Patent No.: US 7,464,872 B2
(45) Date of Patent: Dec. 16, 2008

(54) SYSTEMS AND METHODS FOR MANAGING AN INVENTORY

(75) Inventor: Axel Doerwald, Mississauga (CA)

(73) Assignee: Invatron Systems Corp., Missisauga (CA)

(*) Notice: Subject to any disclaimer, the term of this patent is extended or adjusted under 35 U.S.C. 154(b) by 197 days.

(21) Appl. No.: 11/269,901

(22) Filed: Nov. 9, 2005

(65) Prior Publication Data

US 2007/0102512 A1   May 10, 2007

(51) Int. Cl.
*G06Q 30/00* (2006.01)

(52) U.S. Cl. .................. 235/385; 235/383; 235/462.07; 235/462.01

(58) Field of Classification Search ................ 235/383, 235/385; 705/28, 16, 400, 22
See application file for complete search history.

(56) References Cited

U.S. PATENT DOCUMENTS

| 4,965,825 | A | | 10/1990 | Harvey et al. | |
|---|---|---|---|---|---|
| 5,045,283 | A | | 9/1991 | Patel | |
| 5,109,414 | A | | 4/1992 | Harvey et al. | |
| 5,233,654 | A | | 8/1993 | Harvey et al. | |
| 5,335,277 | A | | 8/1994 | Harvey et al. | |
| 5,478,990 | A | * | 12/1995 | Montanari et al. | 235/375 |
| 5,532,104 | A | | 7/1996 | Goto | |
| 5,578,797 | A | | 11/1996 | Hewitt et al. | |
| 5,711,160 | A | | 1/1998 | Namisniak et al. | |
| 5,712,989 | A | * | 1/1998 | Johnson et al. | 705/28 |
| 5,773,954 | A | | 6/1998 | VanHorn | |
| 5,821,512 | A | | 10/1998 | O'Hagan et al. | |
| 5,887,243 | A | | 3/1999 | Harvey et al. | |
| 5,893,717 | A | | 4/1999 | Kirsch et al. | |
| 6,009,400 | A | | 12/1999 | Blackman | |
| 6,327,576 | B1 | | 12/2001 | Ogasawara | |
| 6,363,366 | B1 | * | 3/2002 | Henty | 705/400 |
| 6,373,573 | B1 | | 4/2002 | Junt et al. | |
| 6,434,530 | B1 | | 8/2002 | Sloane et al. | |
| 6,491,217 | B2 | | 12/2002 | Catan | |
| 6,549,135 | B2 | | 4/2003 | Singh et al. | |
| 6,557,760 | B2 | | 5/2003 | Goodwin, III | |
| 6,587,739 | B1 | | 7/2003 | Abrams et al. | |
| 6,587,835 | B1 | | 7/2003 | Treyz et al. | |
| 6,616,047 | B2 | | 9/2003 | Catan | |
| 6,676,014 | B2 | | 1/2004 | Catan | |
| 6,758,397 | B2 | | 7/2004 | Catan | |
| 2002/0016739 | A1 | * | 2/2002 | Ogasawara | 705/22 |
| 2003/0205412 | A1 | * | 11/2003 | Hewitt et al. | 177/25.15 |
| 2004/0134823 | A1 | | 7/2004 | Bitsonis | |
| 2004/0193497 | A1 | * | 9/2004 | Tanaka | 705/16 |

* cited by examiner

*Primary Examiner*—Michael G Lee
*Assistant Examiner*—Kristy A Haupt
(74) *Attorney, Agent, or Firm*—Bereskin & Parr (57) ABSTRACT

Effectively re-stocking, re-organizing and removing items on display may reduce instances of dissatisfaction amongst shoppers/patrons and also may improve the profitability of a store. However, previous methods for managing displays of products that have limited shelf lives are sometimes time consuming and prone to errors. In contrast, some embodiments of the present invention provide systems and methods for managing the inventory of random weight items in such a way as to reduce the potential that consumers will purchase expired or past-date portions of items offered for sale.

28 Claims, 5 Drawing Sheets

SYSTEMS AND METHODS FOR MANAGING AN INVENTORY

FIELD OF THE INVENTION

The invention relates to inventory control, and, in particular to systems and methods for managing an inventory of random weight items.

BACKGROUND OF THE INVENTION

In a retail environment there are some products that have a limited shelf life. If the product is a food item it is often categorized as perishable, whereas if the product is a non-food item it may simply be described as having a known shelf life. Displays of such products are often managed to ensure that product items on display are suitable for sale in terms of quality, safety, freshness and desired effectiveness. Managing such displays involves replenishing diminished stock, removing expired (and/or past-date) items and rotating newer and older items so that older items are displayed more prominently. However, the task of managing such displays is time consuming and prone to error. When oversights and errors do occur, expired items are left available to consumers who then may inadvertently purchase an expired item. Consistently displaying expired items for sale may hurt the image of a retailer in the eyes of consumers, as consumers may subsequently begin to associate the retailer with poor quality and low standards. Many retailers understand that effectively re-stocking, re-organizing and removing items on display may reduce the instances of dissatisfaction amongst shoppers/patrons. Moreover, there is also the aspect of food safety that retailers must manage. If retailers consistently leave expired items out on display, the chances that consumers are exposed to food-borne illnesses may increase.

In particular, in a food retailing business (e.g. a grocery store, deli, butcher shop, fish monger, convenience store, etc.), a public image of offering fresh products can be very beneficial. Many food products are perishable and are often marked with an expiry date or the like (e.g. a "best before" date or a "sell by" date). Portions of products on display are not always sold in good time, so some retailers have staff regularly rotate, replenish and remove displayed perishable products in an attempt to provide a basic level of quality control over the perishable products offered for sale. Moreover, arranging displays by a date-based sequence is sometimes useful in achieving good product movement/rotation for a retailer.

Often of particular interest to food retailers, are perishable products that are categorized and offered as Random Weight Items (RWI). Random weight items are products that are offered in various and irregular portion sizes. For example, in a grocery store, there are often pre-cut variable-sized portions of various cheese, deli and meat selections. Irrespective of the size and price of individual portions of a random weight item, food retailers try to ensure that the portions on display are reasonably fresh and are provided to consumers in accordance with food safety guidelines. However, this task can sometimes be difficult because particular portions of such items are often packaged on different dates, have different expiry dates and are of different weights, but are nevertheless displayed together in one display case. Consequently, it is time consuming and laborious to identify and remove portions of perishable products that are past an effective date.

For example, it is common for a type of cheese to be provided in different-sized portions. As consumers forage through a display case for a suitable portion size the displayed portions of cheese are moved around and shuffled. As the stock of displayed portions of cheese diminishes over the course of a day or week, additional portions of cheese are cut, packaged and added to the display case. Attempts are often made to re-arrange older portions and remove expired portions of cheese as the newer portions of cheese are added to the display. However, it is difficult to ensure that none of the portions of cheese on display are expired or are close to expiring. Moreover, inventory control of random weight items is sometimes further complicated by the fact that different random weight items may also have different respective shelf lives and are also displayed together. For example, a fresh cut portion of cheddar cheese may expire in one week, whereas a portion of mozzarella cheese may expire in two or three days. The level of complication can be exacerbated in retail outlets that offer a large selection of different random weight items.

SUMMARY OF THE INVENTION

According to an aspect of an embodiment of the invention there is provided a method of packaging and labelling a plurality of portions of a product sold as a random weight item by modifying a product label code standard, the method comprising: assigning an at least one digit batch number to a respective plurality of portions of a product sold as a random weight item; creating a plurality of product label codes in accordance with a product label code standard wherein each of the product label codes corresponds to a respective one of the plurality of portions of the product sold as a random weight item; and wherein the step of creating the plurality of product label codes comprises modifying each product label code by replacing a selected field with the at least one digit batch number that is not provided by the product label code standard.

In accordance with some aspects of the invention the product label code standard comprises a country code field occupying at least one digit; and the country code field is the selected field such that the step of creating the plurality of product label codes further comprises modifying each product label code by replacing the country code field with the at least one digit batch number. According to more aspects the product label code standard is EAN/UCC-14 specified standard 14-digit Universal Product Code (UPC) code-structure that includes a two-digit country code field, a one digit item type field containing a value for indicating a random weight item, an item code field having five digits, a one digit price check field, a four digit price (value) field, and a one digit overall check field, wherein each of the plurality of 14-digit product label codes corresponds to a respective one of the plurality of portions of the product sold as a random weight item; and, the country code field is the selected field such that the step of creating the plurality of product label codes comprises modifying each product label code by replacing the respective two digit country code field in each of the plurality of 14-digit product label codes with the assigned at least one digit batch number representing the respective plurality of portions of the product sold as a random weight item.

In some embodiments the batch number includes only one digit for storing a value representative of the particular plurality of portions of the product sold as a random weight item. In some related embodiments the other digit of the replaced two-digit country code field is a dummy value. In other embodiments, the batch number field includes two digits for storing a value representative of the particular plurality of portions of the product sold as a random weight item.

According to an aspect of an embodiment of the invention there is provided a system for managing an inventory of portions of at least one product sold as a random weight item comprising: a weigh scale manager connectable to at least one electronic weigh scale for receiving portion information about a plurality of portions of a product sold as a random weight item; and an inventory database for storing at least one record containing portion information about a plurality of portions of a product sold as a random weight item, and wherein the inventory database is connectable to the weigh scale manager to receive the portion information.

In some embodiments the system further comprises a Point-Of-Sale (POS) controller connectable to the inventory database for scheduling queries of the inventory database to retrieve portion information.

In some embodiments the portion information comprises an item code, the number of portions in the plurality of portions, an effective date for each of the plurality of portions, and a batch number value.

In some embodiments the batch number value is representative of a corresponding plurality of portions of a product sold as a random weight item.

In some embodiments the effective date comprises at least one of an expiry date, a best before date, a sell by date, a use by date and the like.

In some embodiments the portion information further comprises a price value for each of the plurality of portions.

In some embodiments the inventory database is searchable by at least the item code and batch number to identify the corresponding effective date.

In some embodiments the inventory database is also searchable by the price value of a particular portion to identify the corresponding effective date of the particular portion.

In some embodiments the POS controller is connectable to at least one POS device capable of scanning a 14-digit code-structure for random weight items, interchangeable with the EAN/UCC-14 specified standard 14-digit Universal Product Code (UPC) code-structure, wherein the difference comprises a batch number field provided in place of a two digit country code field, the batch number field having at least one digit for storing a batch number value representative of a particular plurality of portions of a product sold as a random weight item.

According to an aspect of an embodiment of the invention there is provided a method for checking an effective date of a random weight item from information in a product label code for random weight items, the product label code having respective fields for storing an item code value and a batch number value, wherein the batch number value is representative of a particular plurality of portions of a product sold as a random weight item, the method comprising: scanning the product label code to retrieve an item code value and a batch number value; and polling an inventory database using the item code value and batch number value to retrieve an effective date.

In accordance with some aspects of the invention the product label code also has a field for storing an item type value indicating that the scanned product is a portion of a product sold as a random weight item. In some embodiments, other than the respective field for storing the batch number value, the product label code is interchangeable with the EAN/UCC-14 specified standard 14-digit Universal Product Code (UPC) structure with the exception of the batch number field.

In accordance with some aspects of the invention the method further: determining whether or not a scanned item is a portion of a product sold as a random weight item from the product label code on the item; if the scanned item is not a random weight item, processing the scanned information as though the item is not a portion of a product sold as a random weight item; and alternatively, processing the scanned item as though the item is a portion of a product sold as a random weight item. In some embodiments, processing a scanned item as though the item is a portion of a product sold as a random weight item includes polling the inventory database using the item code value and batch number value to retrieve an effective date.

In accordance with some aspects of the invention the product label code also has a field for storing a price value and the method further comprises identifying an effective date in the inventory database as a function of the item code value, batch number value and the price value.

In accordance with some aspects of the invention the method further comprises: determining whether or not the current date is close to or past the effective date; and, if the current date is close to or past the current date, providing a signal indicating the proximity of the current date to the effective date.

According to an aspect of an embodiment of the invention there is provided a system for managing an inventory of portions of at least one product sold as a random weight item comprising: a central inventory database for storing portion information about a plurality of portions of a product sold as a random weight item distributed to at least one retail outlet; and, a local inventory database, connectable to the central inventory database, for receiving and storing at least a portion of the information stored on the central inventory database.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF EXAMPLE EMBODIMENTS OF THE INVENTION

Effectively re-stocking, re-organizing and removing items on display may reduce instances of dissatisfaction amongst shoppers/patrons and also may improve the profitability of a store. Moreover, effectively managing displayed portions of perishable products may also help retailers to better conform to food safety guidelines, thereby possibly reducing the chances of promoting the spread of food-borne illnesses. However, previous methods for managing displays of products that have limited shelf lives are sometimes time consuming and prone to errors. In contrast, some embodiments of the present invention provide systems and methods for managing the inventory of random weight items in such a way as to reduce the potential that consumers will purchase expired or past-date portions in a display.

Random weight items are typically produced in batches, as displayed stock is depleted. As batches are processed individual portions are weighed, priced, packaged (e.g. wrapped) and labeled. A label often includes the standard 14-digit Universal Product Code (UPC) code-structure and a corresponding machine-readable bar-code that can be read and/or scanned by scanning devices at the point-of-sale (e.g. a check-out or cashier counter) or at another location within a store. A 14-digit UPC code for a particular product contains an item code field that is used to contain a product identification number corresponding to a particular product. The label also typically includes human-readable fields, such as for example, a price field and effective date field. An effective date is, without limitation, at least one of an expiry date, a best before date, a sell by date, a use by date or the like. The price field is typically the most prominent field and is usually the first (and sometimes the only) field that some consumers check.

In accordance with some aspects of some embodiments of the invention, the standard 14-digit UPC code-structure for random weight items is modified to include information that may be used to determine the effective date for a packaged portion of a random weight item. In accordance with some very specific embodiments, the standard 14-digit UPC code-structure is modified to create a new 14-digit UPC code that has an at least one digit Batch Number (BN) field in place of the two digit country-code field included in the standard 14-digit UPC code-structure. The standard 14-digit UPC code is specified by the EAN/UCC-14 standard for barcodes that has been recently incorporated into the Global Trade Item Number (GTIN) family of standards (http://www.gtin.info), that is incorporated herein by reference.

Typically, the unit price (e.g. price per weight) is the same for all portions of a particular product sold as a random weight item. Since the packaging of such products typically produces various and often irregular-sized portions, each portion typically has a corresponding, and sometimes unique, price. That is, the price of each of the individually packaged and labeled portions may also be slightly different from others as a result of the irregular portion sizes and fixed unit price. However, it is not uncommon to end up with two or more portions of a product with the same price value because portion sizes typically fall into a relatively confined range. Thus, in accordance with some embodiments of the invention the price field of a portion of a product sold as a random weight item may also be used in combination with the batch number to identify and/or determine the effective date of the portion. According to some very specific aspects of the invention, the price field is larger and bolder than other fields, which thereby allows the price field to be used as a visual queue for manual sorting and culling of displayed portions.

In accordance with some aspects of some embodiments, a database is provided linking information about item codes, batch numbers and effective dates for individual portions of at least one type of product. Each type of product is typically identified as having a unique UPC Item Code and corresponding product description, which will be described in greater detail with reference to FIG. 2 below. That is, in some form a listing of packaged portions on display is maintained in the database containing at least item codes, batch numbers and effective dates. In more specific embodiments the database is further adapted to link information about prices to the aforementioned information. The database can be polled at a point-of-sale or at another location within a store to determine whether or not a particular portion of a product, that is on sale as a random weight item, is past a corresponding effective date. Additionally and/or alternatively, the database can be polled to retrieve and print a listing of portions that are in a display that are also past (or close to) an effective date. The listing of portions can then be used during the re-stocking, re-organizing and removing of portions on display. In such situations, it may be advantageous to use the price field to quickly visually identify portions that may be on the listing, as opposed to manually searching using the effective date field to identify portions to be removed from the display.

Additionally, in accordance with some aspects of some embodiments of the invention, there is provided a method for creating and/or updating a database provided to link information about effective dates, batch numbers and item codes for multiple portions of at least one type of product. As noted above, in some more specific embodiments, the database is further adapted to link information about prices to at least item codes, batch numbers and effective dates. Additionally and/or alternatively, the database is provided to link the aforementioned information for a number of different products that are each sold as random weight items.

Additionally and/or alternatively, a master database is provided and maintained at a central processing facility that packages random weight portions of perishable products for a number of retail locations. In such embodiments, at least portions of the master database corresponding to portions for a particular retail location are forwarded to the particular retail location for inventory and effective date tracking in accordance with some aspects of the invention.

Figure 1:
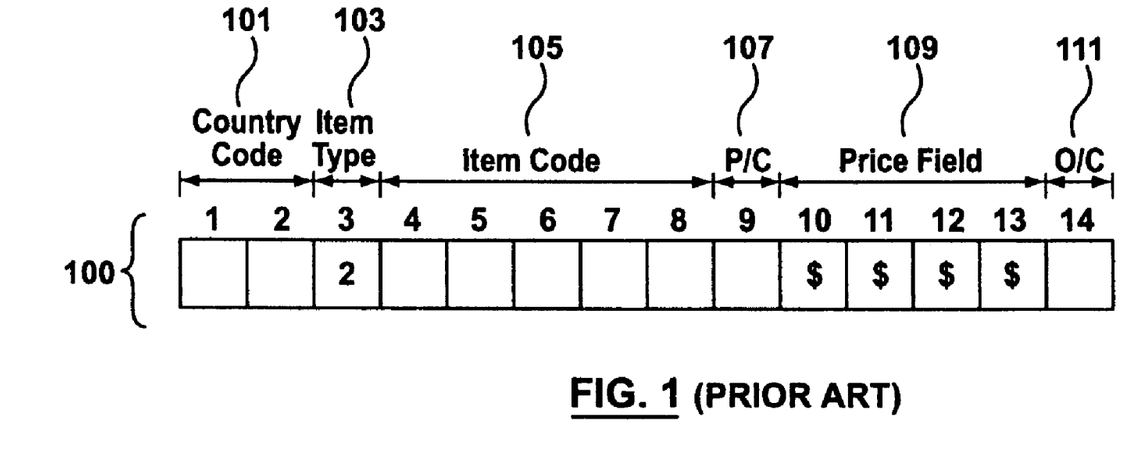
FIG. 1 is an illustration of a prior art 14-digit Universal Product Code (UPC) code-structure for random weight items.

Referring to FIG. 1, shown is an illustration of a prior art 14-digit UPC code-structure for random weight items, generally indicated by 100, and referred to hereinafter as the standard 14-digit UPC code 100 for brevity.

The standard 14-digit UPC code 100 is in fact specified by the EAN/UCC-14 standard for barcodes, which is incorporated herein by reference The standard 14-digit UPC code 100 includes a two digit country-code field 101, a one digit item type field 103, a five digit item code field 105, a one digit price check (P/C) field 107, a four digit price (value) field 109, and a one digit overall check (O/C) field 111.

The item code field 105 is used to provide an item specific five-digit identification number. The country-code field 101 is used to provide country-of-origin information for the item, as different countries are provided with different two digit numbers in the publicly available 14-digit UPC code standards. The item type field 103 is used to indicate the type of item that is represented. In particular, as shown in FIG. 1, the item code is 2 for products sold as random weight items. The price check (P/C) field 107 is used (by electronic scanners) to check that the price field 109 was scanned without error. The price field 109 is used to provide a price value for the item. The overall check (O/C) field 111 is used to check that the entire standard 14-digit UPC code 100 was scanned without error.

Figure 2:
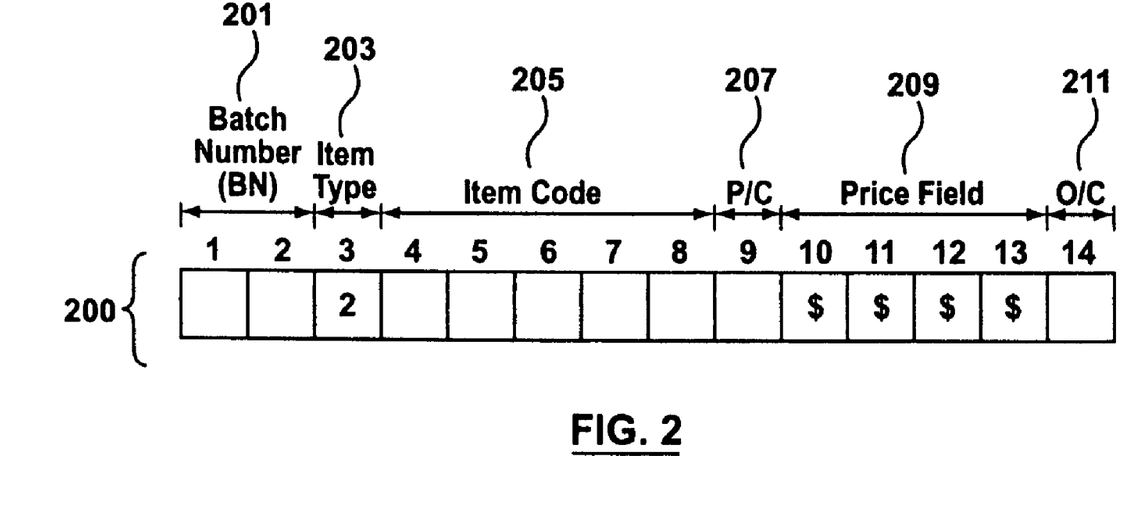
FIG. 2 is an illustration of a new 14-digit UPC code-structure for random weight items according to an embodiment of the invention.

FIG. 2 is an illustration of a new 14-digit UPC code structure for random weight items according to an embodiment of the invention, generally indicated by 200, and referred to hereinafter as the new 14-digit UPC code 200. Fields 203, 205, 207, 209 and 211 of the new 14-digit UPC code 200 correspond in name and function to the fields 103, 105, 107, 109 and 111 of the standard 14-digit UPC code 100. Accordingly, the descriptions of the fields 203, 205, 207, 209 and 211 will not be repeated for the sake of brevity. However, in contrast to the standard 14-digit UPC code 100, the new 14-digit UPC code 200 includes a two-digit batch number (BN) field 201 in place of the two digit country-code field 101.

The use of the new 14-digit UPC code 200 is described in more detail below with reference to FIGS. 3-5. However, briefly, in use, each time a batch of portions (of a product sold as a random weight item) is processed, priced and labeled, a respective batch number is assigned to all the portions of the batch. In many instances the effective date for all of the portions in a batch may be the same. However, there may also be instances where some and/or each of the portions has a different effective date.

Figure 3A:
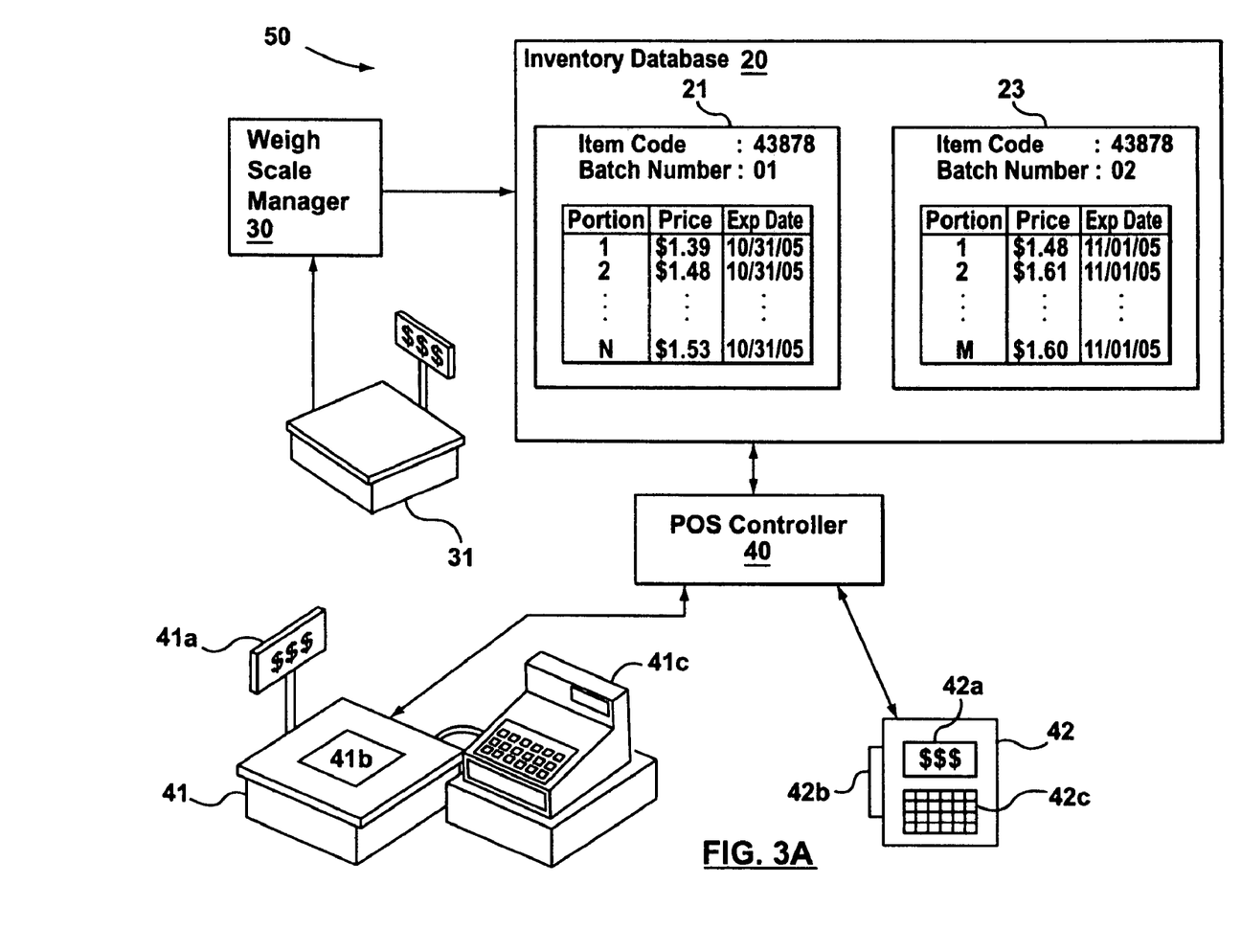
FIG. 3A is schematic illustration of a first system for inventory control of random weight items according to an embodiment of the invention.

Turning to FIG. 3A, and with continued reference to FIG. 2, shown is a schematic illustration of a first system 50 for inventory control of random weight items according to an embodiment of the invention. The first system 50 includes an inventory database 20, a weigh scale manager 30 and a Point-of-Sale (POS) Controller 40. The first system 50 is also connectable to at least one electronic weigh scale suitable for weighing, pricing and labeling portions of random weight items, and for providing portion and price information for each portion of a batch to the weigh scale manager 30. Although only one electronic weigh scale 31 is shown in FIG. 3A, those skilled in the art will appreciate that any number of electronic weigh scales can be provided in combination with embodiments of the invention. Moreover, devices similar to electronic weigh scales, such as item counters and "pre-pack" scales (and the like) that provide portion and price information for each portion of a batch, may also be connectable to the first system 50. The first system 50 is also accessible by POS devices, such as for example, a cashier counter 41 and a wireless handheld price scanner 42. Again, although only one cashier counter 41 and one handheld price scanner 42 are shown in FIG. 3A, those skilled in the art will appreciate that any number of POS devices can be provided in combination with embodiments of the invention. In general, a system according to aspects of an embodiment of the invention includes any suitable combination of devices and connections to other networks and/or systems in addition to any suitable combination of hardware, software and firmware for supporting desired functionality and modes of operation. For example, in many embodiments, the inventory database 20 is provided in combination with control software (not shown) that may be independent of other software modules provided in the first system 50.

The inventory database 20 is provided to store and link information related to at least item codes, batch numbers and effective dates for at least one type of product sold as a random weight item. That is, in some form a listing of packaged portions on display is maintained in the database 20 containing at least item codes, batch numbers and effective dates. In more specific embodiments the database is further adapted to link information about prices to the aforementioned information. For example, as shown in FIG. 3A, the database 20 includes first and second records 21 and 23 illustrated in a table format for the sake of illustration. In some embodiments, the records are stored as electronic data and linked using software organizational techniques such as, for example and without limitation, pointers, linked lists, data trees and relational databases.

A respective item code field, a batch number field, and an enumerated listing of portions characterize each of the first and second records 21 and 23, and each portion in the enumerated listing of portions has an associated effective date field (labeled "Exp Date"). In this particular example, the effective date field indicates the expiry date. However, in other embodiments, the effective date field may additionally and/or alternatively include any suitable combination of an expiry date field, a best before date field, a sell by date field, a use by date field and the like. Optionally, as also shown in FIG. 3A, each portion in the enumerated listing of portions also includes a price field. Including the price field in some embodiments is helpful in determining the effective date of a particular portion when not all of the portions have the same effective date. On the other hand, when all of the portions in a particular listing do have the same effective date the price field does not provide any more useful information for searching the listing.

As shown for example only, the respective item code field for both the first and second records 21 and 23 is "43878", meaning that the same product is represented by each of the two separate records 21 and 23. At the same time, however, the batch number field for each of the first and second records 21 and 23 have the values "01" and "02", respectively, which provides a point of distinction between the two records 21 and 23. Accordingly, when the inventory database 20 is polled a corresponding search is carried out to identify the item code first, then the batch number to retrieve the appropriate record. That record can then be searched to determine the effective date of a particular portion. As described above, the searching for a particular record may or may not include searching according to the price of a particular portion.

Those skilled in the art will appreciate that the inventory database illustrated in FIG. 3A has been provided as an illustrative example only, and that in accordance with aspects of the invention an inventory database may contain multiple batch records for multiple products that are all sold as random weight items.

The weigh scale manager 30 is connectable to one or more electronic weigh scales, such as for example, the electronic weigh scale 31. The functional role of the weigh scale manager 30 is to collect item code, effective date and portion information from an electronic weigh scale on a per batch basis, and upload said information to the inventory database 20. The batch number for a particular batch of portions can be assigned by either the weigh scale manager 30 or by control software included with the inventory database 20. An example method of creating and/or updating a database record is described in more detail below with reference to FIG. 4.

The POS controller 40 is effectively the interface between the POS device(s) and the inventory database 20. Once a portion is scanned at a POS device (e.g. cashier counter 41), the POS device sends the item code, batch number and optionally price value information extracted from the new 14-digit UPC code 200 to the POS controller 40. The POS control 40 then queries or polls the inventory database 20 to retrieve the effective data information corresponding to the scanned portion. In accordance with some embodiments, in the event that multiple portions are identified (even using the price field), a signal may be sent from the inventory database 20 indicating that multiple portions were found. Accordingly, the POS controller 40 is responsible for scheduling queries and returning effective date information to the POS devices included in combination with an embodiment of the invention. An example method of checking for an expiry date of a random weight item according to aspects of the invention is described in more detail below with reference to FIG. 5.

More generally, the inventory database 20 can be polled at any POS or at another location within a store to retrieve effective date information for a product portion on display.

Additionally and/or alternatively, the database can be polled to retrieve and print a listing of portions that are in a display that are also past (or close to) an effective date. The listing of portions can then be used during the re-stocking, re-organizing and removing of portions on display. In such situations, it may be advantageous to use the price field to quickly visually identify portions that may be on the listing, as opposed to manually searching using the effective date field to identify portions to be removed from the display. Some embodiments of the first system 50, when employed effectively, may improve the process of selling fresh products (as random weight items) as well as enabling the prompt removal and replacement of stale portions.

Figure 3B:
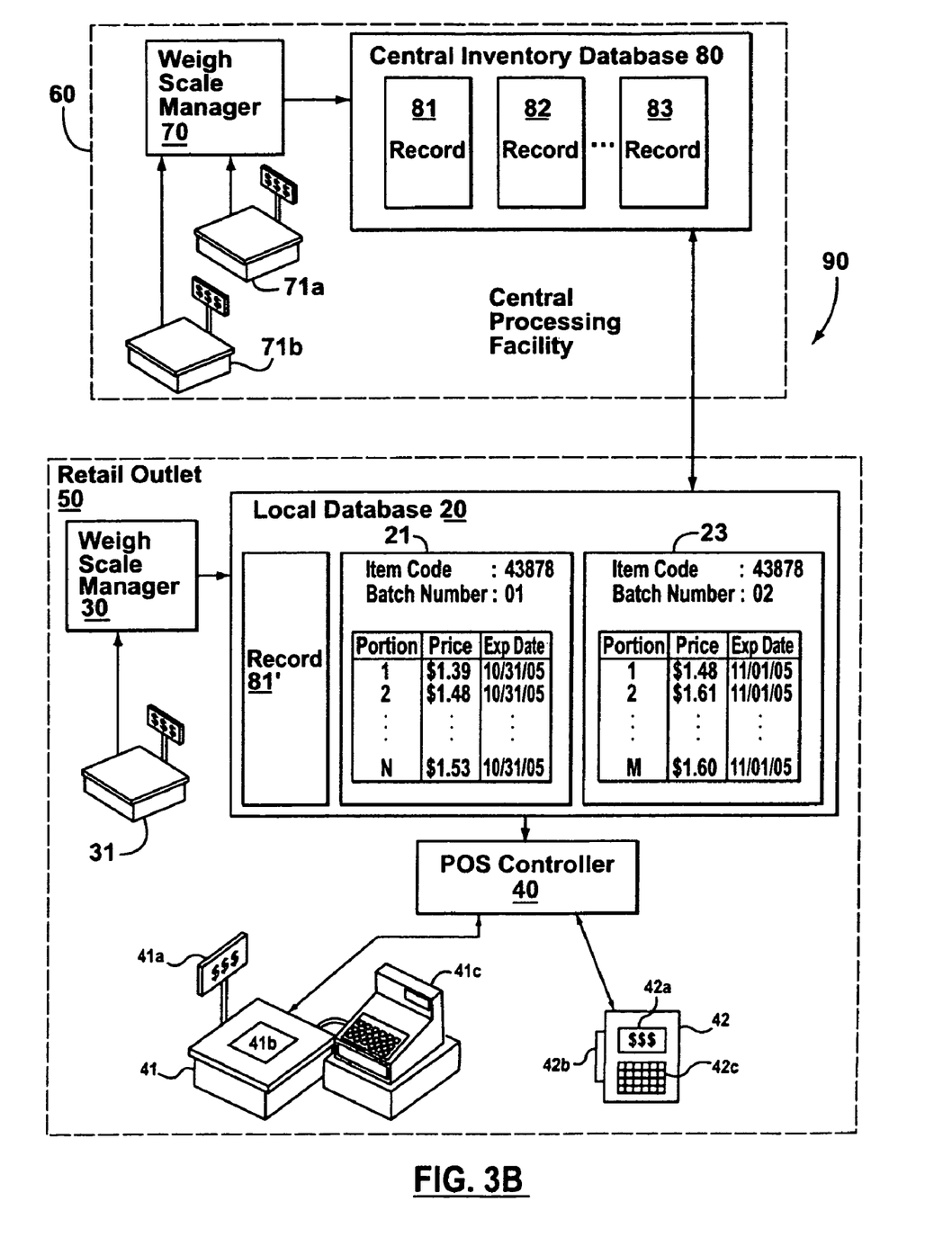
FIG. 3B is a schematic illustration of a second system for inventory control of random weight items according to an embodiment of the invention.

FIG. 3B is a schematic illustration of a second system 90 for inventory control of random weight items according to an embodiment of the invention. The second system 90 is an expansion of the first system 50 in which some portions of packaged random weight items are packaged at a central processing facility 60 and sent to a retail outlet 50' having the first system 50 described above with reference to FIG. 3A. As such, there are a number of the elements common to both FIGS. 3A and 3B and accordingly, elements common to both share common reference numerals and will not be re-introduced for the sake of brevity.

The second system 90 includes two databases. The first database is a central inventory database 80 located at the central processing facility 60, and the second database is a local inventory database 20', similar to the inventory database 20 shown in FIG. 3A, which is located at the retail outlet 50'. The central inventory database 80 and local inventory database 20 are connectable by a suitable combination of hardware, software, firmware and public and/or private communication links.

The central processing facility also includes a weigh scale manager 70 and at least one weigh scale. In FIG. 3B, first and second weigh scales 71a and 71b are provided as an illustrative example only. The weigh scale manager 70 and associated weigh scales 71a, 71b are operated in a similar manner to the weigh scale manager 30 and associated weigh scale 31, described above with reference to FIG. 3A and below as per the very specific example described with reference to FIG. 4.

In operation, as portions of perishable products are packed at the central processing facility 70, records of the packaging information including effective date, batch number and price information are stored in the central inventory database 80. As shown for example only, records 81, 82 and 83 are kept within the central inventory database 80. When packaged portions are sent to a particular retail outlet (e.g. retail outlet 50'), at least a portion of the records in the central inventory database 80 are also sent to a respective local inventory database (e.g. local inventory database 20) for inventory and effective date tracking in accordance with some aspects of the invention. As shown in FIG. 3B, a copy of the record 81, shown as record 81', is copied from the central inventory database 80 to the local inventory database 20 to be included with the first an second records 21 and 23, described above with reference to FIG. 3A. Within the retail outlet 50', the first system 50 can be used as described above to package and track all items within the retail outlet 50' including those items packaged at the central processing facility 60.

With continued reference to FIG. 3B, in addition to batch numbers, items codes and price information, records (e.g. record 81) first created for the central inventory database 80 may, in accordance with aspects of some embodiments of the invention, include a store number or similar identifier. That is, in accordance with aspects of some embodiments, records may also be identified by store number corresponding to a particular store where particular portions of a product sold as a random weight item are sent for sale after being packaged at the central processing facility 60.

Figure 4:
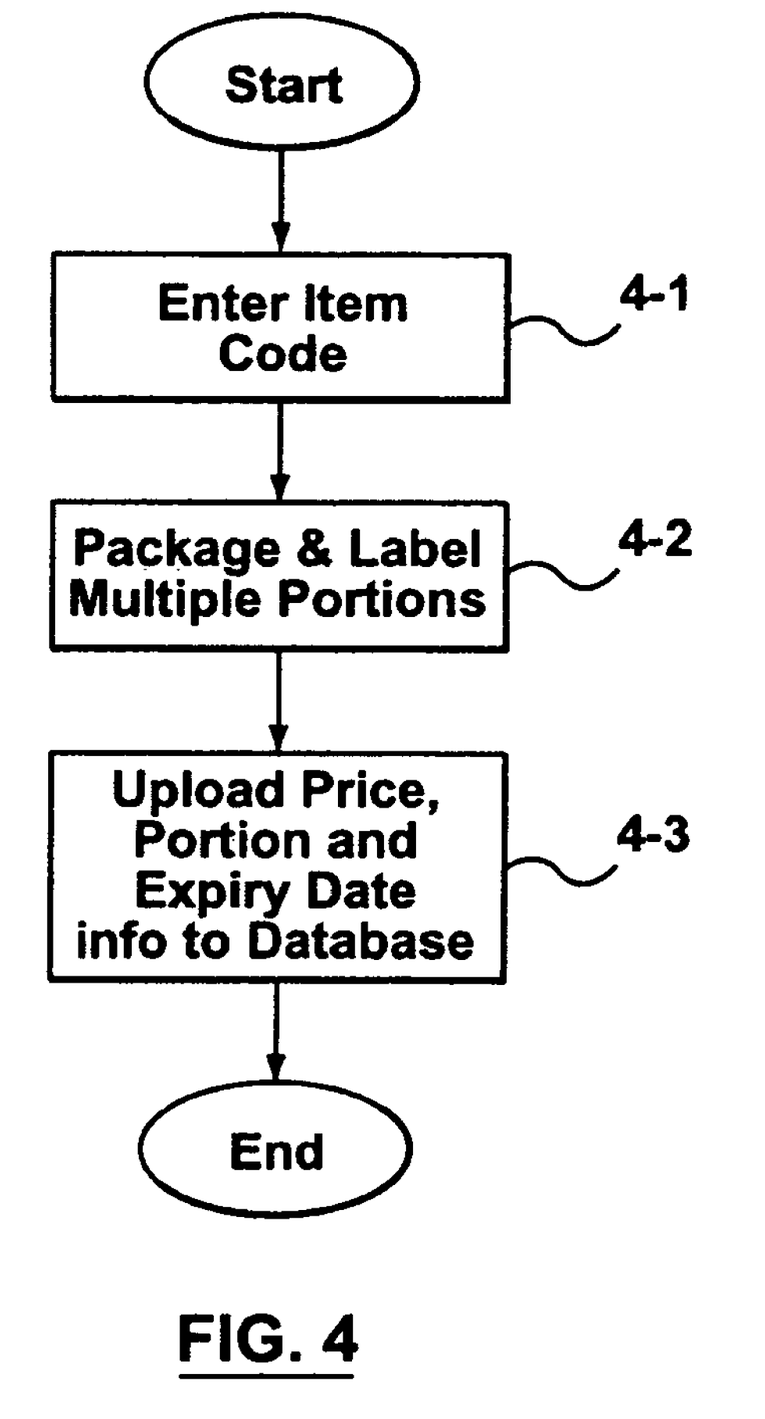
FIG. 4 is a flow chart illustrating an example method for creating and/or updating an inventory database for random weight items according to aspects of the invention.

Referring to FIG. 4, and with further reference to FIGS. 2 and 3, shown is a flow chart illustrating a method for creating and/or updating an inventory database (e.g. inventory database 20) for random weight items according to aspects of the invention.

Specifically, starting at step 4-1 the item code for a particular product is entered into an electronic weigh scale, which in turn sets the price per unit (e.g. price per pound) for the portions to be packaged and labeled and establishes a batch number for the batch. In some embodiments, a batch number for a batch is created by either the electronic weigh scale, the weigh scale manager or by control software included in combination with the database. Preferably, a unique batch number is created, after the item code is entered into an electronic weigh scale, by choosing and/or checking that there are no conflicting batch numbers for the entered item code already in the database. Additionally and/or alternatively, a record in the inventory database can be added to by entering the item code and a known batch number into the electronic weigh scale.

Additionally and/or alternatively, the same batch number is used each and ever each and every time a particular Item Code is entered (by PLU Number) during a given period. For example, if the shelf life for a particular product is measured in days, then it would be beneficial for all items packaged and labeled on the same day to be assigned the same batch number. In another example, for a product like in-store prepared food (e.g. roast chicken or sushi), it may be preferable to create a new batch number every two hours.

At step 4-2, a batch of portions is packaged, weighed and labeled. As this is done the electronic weigh scale saves the portion and price information for each portion weighed. The portion information can be as simple as a portion number or the respective weight of each portion. The labels for each portion in the batch contain the new 14-digit UPC code 200 that includes the batch number created in step 4-1. Finally, once the batch of portions is packaged, weighed and labeled, the portion and price information is uploaded to the database via a weigh scale manager (e.g. weigh scale manager 30) during step 4-3.

Figure 5:
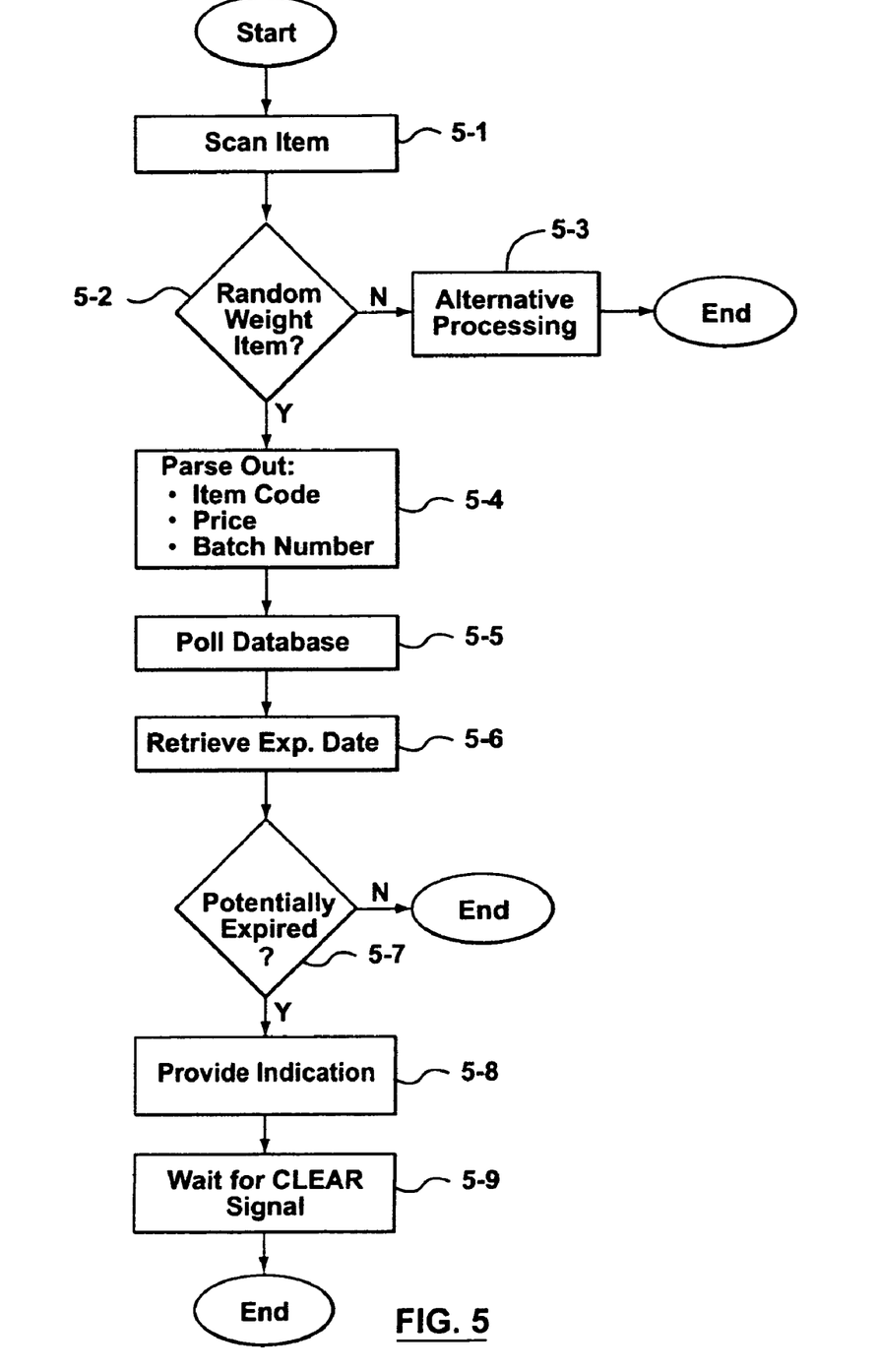
FIG. 5 is a flow chart illustrating an example method for checking an expiry date of a random weight item according to aspects of the invention.

Referring to FIG. 5, and with further reference to FIGS. 2 and 3, shown is a flow chart illustrating a method for checking an expiry date of a random weight item according to aspects of the invention. Starting at step 5-1, a product having either the standard 14-digit UPC code 100 or the new 14-digit UPC bar code 200 structure (printed on a respective label) is scanned by a POS device. Since the new 14-digit UPC code 200 is similar in structure to the standard 14-digit UPC code 100, equipment currently in stores will be able to scan the new 14-digit code 200 without additional software upgrades. However, new software may be required to implement the remainder of the method illustrated in the flow chart of FIG. 5.

At step 5-2, the item type field is checked to determine whether or not the scanned item is a packaged portion of a product sold as a random weight item. If the item is a random weight item it may have the new 14-digit UPC code 200 if the system was installed effectively to cover all such products in a particular store. Moreover, if the item is a random weight item the item type field (which is common to both codes 100 and 200) should have the value "2" (as specified by the EAN/UCC standards). Accordingly, the determination of whether or not a scanned product is a portion of a product sold as a random weight item is simplified to making a determination as to whether or not the item type field of the scanned item has the value "2". If the item type field does not have the value "2" (no path, step 5-2), then the method proceeds to step 5-3 in which alternate processing is enabled under the assumption that the label is not for a random weight item and thus does not contain the new 14-digit UPC code 200. On the other hand, if the item type field does contain the value "2" (yes path, step 5-2), the scanned product is determined to be a portion of a product sold as a random weight item and the method continues to step 5-4.

At step 5-4, the new 14-digit code 200 is processed further to parse out the item code, price and batch number. Subsequently, at step 5-5 the database is polled using at least the item code and batch number, and optionally the price. At step 5-6 the expiry date is retrieved and at step 5-7 it is determined whether or not the portion is past the expiry date. If the expiry date has not passed (no path, step 5-7), the method ends and no alert signals are provided. On the other hand, if the expiry date has passed (yes path, step 5-7), then the user of the POS device, at which the portion was scanned, is provided with some kind of indication (audio, visual, etc.) that the effective date for the portion may cause the purchaser to reconsider purchasing the portion. At step 5-9, the method waits to receive a feedback (e.g. a CLEAR) signal from the user before ending, at which time a new product can then be scanned or another action be taken.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention. Numerous modifications and variations of the present invention are possible in light of the above teachings. It is therefore to be understood that within the scope of the appended claims, the invention may be practiced otherwise than as specifically described herein.

I claim:

1. A method of packaging and labelling a plurality of portions of a product sold as a random weight item by modifying a product label code standard, the method comprising:
   assigning an at least one digit batch number to a respective plurality of portions of a product sold as a random weight item;
   creating a plurality of product label codes in accordance with a product label code standard wherein each of the product label codes corresponds to a respective one of the plurality of portions of the product sold as a random weight item; and
   wherein the step of creating the plurality of product label codes comprises modifying each product label code by replacing a selected field with the at least one digit batch number that is not provided by the product label code standard.

2. A method according to claim 1, wherein the product label code standard comprises a country code field occupying at least one digit; and the country code field is the selected field such that the step of creating the plurality of product label codes further comprises modifying each product label code by replacing the country code field with the at least one digit batch number.

3. A method according to claim 2, wherein the batch number includes only one digit for storing a value representative of the particular plurality of portions of the product sold as a random weight item.

4. A method according to claim 3, wherein the other digit of the replaced two-digit country code field is a dummy value.

5. A method according to claim 2, wherein the batch number field includes two digits for storing a value representative of the particular plurality of portions of the product sold as a random weight item.

6. A method according to claim 1, wherein the product label code standard is EAN/UCC-14 specified standard 14-digit Universal Product Code (UPC) code-structure that includes a two-digit country code field, a one digit item type field containing a value for indicating a random weight item, an item code field having five digits, a one digit price check field, a four digit price (value) field, and a one digit overall check field, wherein each of the plurality of 14-digit product label codes corresponds to a respective one of the plurality of portions of the product sold as a random weight item; and the country code field is the selected field such that the step of creating the plurality of product label codes comprises modifying each product label code by replacing the respective two digit country code field in each of the plurality of 14-digit product label codes with the assigned at least one digit batch number representing the respective plurality of portions of the product sold as a random weight item.

7. A system for managing an inventory of portions of at least one product sold as a random weight item comprising:
   at least one electronic weigh scale operable to print a plurality of labels for a plurality of portions of a product sold as a random weight item, wherein each label comprises portion information comprising a batch number value for indicating that the portion belongs to the plurality of portions;
   a weigh scale manager connectable to the at least one electronic weigh scale for receiving the portion information for each portion in the plurality of portions from the at one electronic weigh scale;
   an inventory database for storing at least one record containing portion information about a plurality of portions of a product sold as a random weight item, and wherein the inventory database is connectable to the weigh scale manager to receive the portion; and,
   a Point-Of-Sale (POS) controller connectable to the inventory database for scheduling queries of the inventory database to retrieve portion information.

8. A system according to claim 7, wherein the portion information further comprises an item code, the number of portions in the plurality of portions, and an effective date for each of the plurality of portions.

9. A system according to claim 8, wherein the effective date comprises at least one of an expiry date, a best before date, a sell by date, a use by date and the like.

10. A system according to claim 8, wherein the portion information further comprises a price value for each of the plurality of portions.

11. A system according to claim 10, wherein the inventory database is searchable by at least the item code and batch number to identify the corresponding effective date.

12. A system according to claim 11, wherein the inventory database is also searchable by the price value of a particular portion to identify the corresponding effective date of the particular portion.

13. A system according to claim 7, wherein the POS controller is connectable to at least one POS device capable of scanning a 14-digit code-structure for random weight items, interchangeable with the EAN/UCC-14 specified standard 14-digit Universal Product Code (UPC) code-structure, wherein the difference comprises a batch number field provided in place of a two digit country code field, the batch number field having at least one digit for storing a batch number value representative of a particular plurality of portions of a product sold as a random weight item.

14. A system according to claim 13, wherein the POS device is located at a cashier counter in a retail store.

15. A system according to claim 13, wherein the POS device is a handheld price scanner.

16. A system according to claim 13, wherein the batch number field includes only one digit for storing a batch number value representative of the particular plurality of portions of a product sold as a random weight item.

17. A system according to claim 16, wherein the other digit of the replaced two-digit country code field is a dummy value.

18. A system according to claim 16, wherein the batch number field includes two digits for storing a batch number value representative of the particular plurality of portions of a product sold as a random weight item.

19. A system according to claim 7, wherein the POS controller is connectable to at least one POS device for scanning the label to retrieve the batch number value.

20. A system according to claim 7, wherein the label further comprises a product label code in accordance with a product label code standard wherein a selected field of the product label code is replaced with the batch number value that is not provided by the product label code standard.

21. A method for checking an effective date of a random weight item from information in a product label code for random weight items, the product label code having respective fields for storing an item code value, a batch number value, and an item type value wherein the batch number value is representative of a particular plurality of portions of a product sold as a random weight item and the item type value indicates that a scanned product is a portion of a plurality of a product sold as a random weight item, the method comprising:
    scanning the product label code to retrieve the item code value, the batch number value and the item type value; and
    polling an inventory database using the item code value, batch number value and item type value to retrieve an effective date.

22. A method according to claim 21, wherein other than the respective field for storing the batch number value, the product label code is interchangeable with the EAN/UCC-14 specified standard 14-digit Universal Product Code (UPC) structure with the exception of the batch number field.

23. A method according to claim 22, further comprising: determining whether or not a scanned item is a portion of a product sold as a random weight item from the product label code on the item; if the scanned item is not a random weight item, processing the scanned information as though the item is not a portion of a product sold as a random weight item; and attentively, processing the scanned item as though the item is a portion of a product sold as a random weight item.

24. A method according to claim 23, wherein processing a scanned item as though the item is a portion of a product sold as a random weight item includes polling the inventory database using the item code value and batch number value to retrieve an effective date.

25. A method according to claim 21, wherein the product label code also has a field for storing a price value and the method further comprises identifying an effective date in the inventory database as a function of the item code value, batch number value and the price value.

26. A method according to claim 21, wherein the effective date includes at least one of an expiry date, a best before date, a sell by date, a use by date and the like.

27. A method according to claim 21, further comprising: determining whether or not the current date is close to or past the effective date; and if the effective date is close to or past the current date, providing a signal indicating the proximity of the current date to the effective date.

28. A system for managing an inventory of portions of at least one product sold as a random weight item comprising:
    at least one electronic weigh scale operable to print a plurality of labels for a plurality of portions of a product sold as a random weight item, wherein each label comprises portion information comprising a batch number value for indicating that the portion belongs to the plurality of portions;
    a weigh scale manager connectable to the at least one electronic weigh scale for receiving the portion information for each portion in the plurality of portions from the at one electronic weigh scale;
    an inventory database for storing at least one record containing portion information about a plurality of portions of a product sold as a random weight item, and wherein the inventory database is connectable to the weigh scale manager to receive the portion information; and,
    a local inventory database, connectable to the inventory database, for receiving and storing at least a portion of the information stored on the inventory database.

* * * * *